United States Patent
Park et al.

(10) Patent No.: US 9,716,981 B2
(45) Date of Patent: Jul. 25, 2017

(54) DATA TRANSMISSION DEVICE FOR RECORDING VISIT DATA OF WIRELESS COMMUNICATION DEVICE

(71) Applicant: 2GATHER INC., Seoul (KR)

(72) Inventors: Sang Jun Park, Seoul (KR); Yeong Woong Park, Seoul (KR); Sung Ho Park, Seoul (KR); Jun Ho Choi, Gyeonggi-do (KR)

(73) Assignee: 2GATHER INC., Seoul (KR)

( * ) Notice: Subject to any disclaimer, the term of this patent is extended or adjusted under 35 U.S.C. 154(b) by 0 days.

(21) Appl. No.: 14/772,771

(22) PCT Filed: Nov. 21, 2013

(86) PCT No.: PCT/KR2013/010601
§ 371 (c)(1),
(2) Date: Sep. 3, 2015

(87) PCT Pub. No.: WO2014/157804
PCT Pub. Date: Oct. 2, 2014

(65) Prior Publication Data
US 2016/0029177 A1    Jan. 28, 2016

(30) Foreign Application Priority Data

Mar. 28, 2013 (KR) .................. 10-2013-0033167

(51) Int. Cl.
*H04W 4/04* (2009.01)
*G06Q 30/02* (2012.01)
*G06Q 30/04* (2012.01)

(52) U.S. Cl.
CPC .......... *H04W 4/04* (2013.01); *G06Q 30/0205* (2013.01); *G06Q 30/0226* (2013.01);
(Continued)

(58) Field of Classification Search
CPC .. H04W 4/04; G06Q 30/0226; G06Q 30/0205
(Continued)

(56) References Cited

U.S. PATENT DOCUMENTS 9,092,772 B2 *  7/2015  Fernandez ........... G06Q 20/102
9,134,902 B2 *  9/2015  Kang
(Continued)

FOREIGN PATENT DOCUMENTS

JP     05-089220 A     4/1993
JP     2007-066212 A   3/2007
(Continued)

OTHER PUBLICATIONS

International Search Report mailed on Feb. 27, 2014, issued in corresponding International Application No. PCT/KR2013/010601, 3 pages.

*Primary Examiner* — Muthuswamy Manoharan
(74) *Attorney, Agent, or Firm* — Snyder, Clark, Lesch & Chung, LLP

(57) ABSTRACT

Confusion between service providers due to the technical limitation of a GPS sensor included in a wireless communication device of a service user is avoided. A data transmission device connected to a server and for transmitting visit data to a wireless communication device is disclosed. The data transmission device may include a button part, when pressed, for transmitting to the server visit data of the wireless communication device; and touch screen touching parts connected to the button part so as to input an electrical signal to a touch screen of the wireless communication device. The visit data may be transmitted to the wireless communication device from the server when the button is pressed and an electric signal is input to the touch screen. The at least one touch screen touching part may include a plurality of touch screen touching parts, and each of the data (Continued)

transmission devices in a predetermined area may have different layouts of the touch screen touching parts.

8 Claims, 12 Drawing Sheets

(52) U.S. Cl.
CPC ..... *G06Q 30/0259* (2013.01); *G06Q 30/0261* (2013.01); *G06Q 30/04* (2013.01)

(58) Field of Classification Search
USPC .......................................... 455/41.1
See application file for complete search history.

(56) References Cited

U.S. PATENT DOCUMENTS

2009/0104888 A1* 4/2009 Cox ................... G06F 21/31
455/410
2012/0208466 A1* 8/2012 Park .................. G06F 1/1601
455/41.3

FOREIGN PATENT DOCUMENTS

JP         2008-225716 A    9/2008
KR    10-2008-0010792 A    1/2008

\* cited by examiner

DATA TRANSMISSION DEVICE FOR RECORDING VISIT DATA OF WIRELESS COMMUNICATION DEVICE

RELATED APPLICATIONS

This patent application claims the benefit under 35 U.S.C. §371 of International Application Number PCT/KR2013/010601, filed Nov. 21, 2013, which claims priority to Korean Patent Application No. 10-2013-0033167, filed Mar. 28, 2013, both of which are incorporated herein by reference.

TECHNICAL FIELD

The present disclosure relates to a system and a method for logging visit data of a wireless communication device, and more specifically to a system and a method for logging visit data in a wireless communication device when a user carrying the wireless communication device visits a place.

BACKGROUND ART

Previously, when a service user visits a service providing shop such as a restaurant and a café, the service user shows a mileage coupon issued in advance via an off-line or on-line to check the number she/he has visited the shop, and enjoy benefits such as mileage points or an additional service, etc.

Unfortunately, this manner is very cumbersome since a service user has to carry different mileage coupons for different restaurants or cafés. Further, if a service user forgets to carry a mileage coupon, she/he cannot have the visit counted to be added to the total number of visits.

To overcome such shortcoming, smart phones, which are currently prevalent, are increasingly replacing existing mileage coupons. For example, it has been proposed that a service user visits a shop and logs it on a server by scanning a QR code prepared in the shop with her/his smart phone.

In this manner, however, there is a problem in that a service user may take a picture of a QR code prepared in a shop and may cheat using the picture of the QR code as if she/he has visited a restaurant or a café in a place other than the shop.

To address this problem, it has been proposed to use GPS information to detection whether a service user actually visited a particular shop. However, there is still a problem in that a service user can cheat within an error margin of the GPS information as if she/he visited a shop even though she/he stays near the shop.

There is also another problem in that a service user may make false validation and even an evaluation on a service providing shop or a service provider even though she/he has actually not visited the shop.

In addition, previously, a coupon is provided by a service providing shop such as a coffee shop and a hair salon but not by a service provider actually providing the service such as a barista, a hair dresser, etc. Accordingly, there is no way to evaluate individual service providers or collect a coupon from them.

Korean Patent Laid-open Publication No. 10-2004-0063420 discloses a method and a system for offering accumulation point using mobile barcode. The method includes: displaying a barcode on a screen of a terminal (step S101); scanning the displayed barcode (step S102); converting the scanned barcode into processable data (step S103); creating billing data including the converted barcode data and billing amount to transmit it to a main server (step S104); analyzing, by the main server, the received billing data to check membership and billing amount (step S105); paying the billing amount to calculate mileage points for the payment (step S106); collecting the mileage points (step S107); and transmitting payment information and mileage point information to the terminal (step S108).

According to this method, a mileage coupon is replaced by displaying a barcode on a screen of a terminal and scanning it.

However, the reference fails to disclose an interface resembling a real paper mileage coupon allowing service users to enjoy collecting coupons. That is, the reference neither discloses providing an interface resembling a paper coupon to ordinary clerks and customers who are accustomed to paper coupons, nor discloses allowing service users to enjoy collecting coupons, other than simply collecting mileage points.

SUMMARY

Hereinafter, one or more embodiments will be described for providing the basic understanding of the present disclosure. This section is not the general overview of all possible embodiments. In addition, this section is intended neither to specify key elements from among all elements nor to cover the scope of all embodiments. Its sole object is to provide concepts of one or more embodiments in simplified forms as an introduction for the detailed descriptions below.

An object of the present disclosure is to provide a method and a device capable of ensuring that a service user has actually visited a service providing shop.

Another object of the present disclosure is to provide a method and a device capable of offering a reward for a predetermined number of visits by an individual service provider as well as by a service providing shop, and allowing for an evaluation on an individual service provider. Furthermore, another object of the present disclosure is to ensure that an evaluation is made by a service user who has actually used the service.

Another object of the present disclosure is to provide a method and a device capable of checking if a service user has received a service from a particular service provider.

Another object of the present disclosure is to provide a method and a device allowing a service user to be subject to a new experience of collecting coupons via a novel interface.

Another object of the present disclosure is to avoid confusion between service providers due to the technical limitation of a GPS sensor included in a wireless communication device of a service user.

Aspects of the present disclosure provide a system for logging visit data of a wireless communication device. The system may include an electronic device including at least one sensor capable of sensing a location and motion; a wireless communication device including at least one sensor capable of sensing a location and motion; and a server for transmitting to a wireless communication device data indicating that the wireless communication device has visited a place where the electronic device exists, if the at least one sensor included in the electronic device senses and the at least one sensor included in the wireless communication device exists sense that the electronic device and the wireless communication device are within a predetermined distance and a predetermined motion has been performed.

Aspects of the present disclosure also provide a method for logging visit data of a wireless communication device. The method may include transmitting to a server from an electronic device located at a predetermined place data indicating that a wireless communication device has visited the predetermined place; transmitting to the server from the wireless communication device data indicating that the wireless communication device has visited the place where the electronic device is located; and transmitting to the wireless communication device visit data indicating that the wireless communication device has visited the predetermined place.

The method may further include displaying the visit data in the wireless communication device in a predetermined pattern.

Aspects of the present disclosure also provide a data transmission device connected to a server and transmitting visit data to a wireless communication device. The data transmission device may include a grip part made of a conductive material; a button part, when pressed, for transmitting to a server data indicating that visit data is to be transmitted to a wireless communication device; and touch screen touching parts connected to the button part so as to input an electrical signal to a touch screen of a wireless communication device. The visit data may be transmitted to the wireless communication device when the button is pressed and an electric signal is input to the touch screen.

In addition, the visit data may be transmitted to the wireless communication device only if the button is pressed within a time period in which an electric signal is input to the touch screen of the wireless communication device.

The grip part may be made of a conductive material for conducting an electrical current to input an electrical signal to the touch screen.

The data transmission device may further include a computer connection part for connecting the data transmission device to a computer.

The touch screen touching parts may receive an electrical signal from the computer or the data transmission device in order to input an electrical signal to the touch screen.

Aspects of the present disclosure also provide a data transmission device connected to a server and transmitting visit data to a wireless communication device. The data transmission device may include a sensor part including a motion sensor; and touch screen touching parts connected to the sensor part and for touching a touch screen of the wireless communication device. The visit data may be transmitted to the wireless communication device, if a position sensor of the wireless communication device senses that the wireless communication device is located at a place where the data transmission device is installed and the sensor part senses that a motion of the data transmission device taken when the touch screen touching parts touch the touch screen of the wireless communication device.

Aspects of the present disclosure also provide a data transmission device connected to a server and transmitting visit data to a wireless communication device. The data transmission device may include a button part, when pressed, for transmitting to the server data indicating that visit data is to be transmitted to the wireless communication device; and touch screen touching parts connected to the button part so as to touch a touch screen of the wireless communication device. The visit data may be transmitted to the wireless communication device, if a position sensor of the wireless communication device senses that the wireless communication device is located at a place where the data transmission device is installed and the buttons is pressed while the sensor part of the wireless communication device senses that a motion of the wireless communication device taken when the touch screen touching parts touch the touch screen of the wireless communication device.

Aspects of the present disclosure also provide a data transmission device connected to a server and transmitting visit data to a wireless communication device. The data transmission device may include a button part, when pressed, for transmitting to the server visit data for the wireless communication device; and at least one touch screen touching part connected to the button part so as to input an electrical signal to a touch screen of the wireless communication device. The visit data may be transmitted to the wireless communication device from the server when the button is pressed and an electric signal is input to the touch screen. The at least one touch screen touching part may include a plurality of touch screen touching parts, and each of the data transmission devices in a predetermined area may have different layouts of the touch screen touching parts.

The plurality of touch screen touching parts may include three to five touch screen touching parts.

The data transmission device may determine which one of the data transmission devices in the predetermined area has touched the wireless communication device based on the shape of the plurality of touch screen touching parts recognized by the touch screen of the wireless communication device, and may transmit the visit data to the wireless communication device matched to the determined data transmission device.

The data transmission device may further include: a reference magnet that affects a terrestrial magnetism sensor of the wireless communication device when the touch screen touching parts touch the touch screen of the wireless communication device so as to sense a direction in which the touch screen touching part touches the touch screen.

Aspects of the present disclosure also provide a data transmission system for transmitting visit data to a wireless communication device. The data transmission system may include the wireless communication device; a button part, when pressed, for transmitting visit data to the wireless communication device; a data transmission device including at least one touch screen touching part connected to the button part and for inputting an electrical signal to a touch screen of the wireless communication device; and a server for transmitting the visit data to the wireless communication device from the data transmission device. The visit data may be transmitted to the wireless communication device from the server when the button is pressed and an electric signal is input to the touch screen. The at least one touch screen touching part may include a plurality of touch screen touching parts, and each of the data transmission devices in a predetermined area may have different layouts of the touch screen touching parts.

The plurality of touch screen touching parts may include three to five touch screen touching parts.

The data transmission device may determine which one of the data transmission devices in the predetermined area has touched the wireless communication device based on the shape of the plurality of touch screen touching parts recognized by the touch screen of the wireless communication device, and may transmit the visit data to the wireless communication device matched to the determined data transmission device.

The data transmission device may further include: a reference magnet that affects a terrestrial magnetism sensor of the wireless communication device when the touch screen touching parts touch the touch screen of the wireless communication device so as to sense a direction in which the touch screen touching part touches the touch screen.

BRIEF DESCRIPTION OF THE DRAWINGS

The drawings are not necessarily to scale. Dimensions of a variety of features may be exaggerated or reduced for brevity. In addition, a part of the drawings may be simplified for clarity. Accordingly, the drawings may not depict all of components of an apparatus or a method shown therein. Like reference numerals may designate similar features throughout the detailed description and the drawings.

DETAILED DESCRIPTION OF THE EMBODIMENTS

Figure 1:
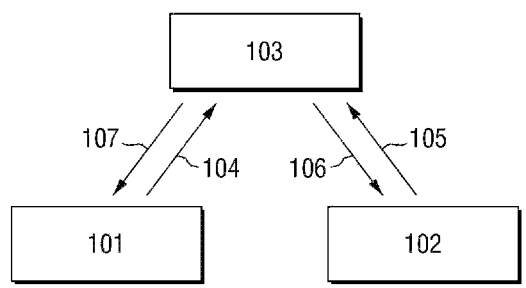
FIG. 1 is block diagram of a system for logging visit data according to an exemplary embodiment of the present disclosure.

Various embodiments will be described with reference to the accompanying drawings, wherein like reference numerals are used to designate like elements. For the sake of illustration, various descriptions are given herein for understanding of the present disclosure. However, it is obvious that embodiments of the present disclosure can be practiced without such descriptions. In different examples, known structure and devices are given as block diagrams for easy understanding of the embodiments.

FIG. 1 is block diagram of a system for logging visit data according to an exemplary embodiment of the present disclosure.

Referring to FIG. 1, an electronic device 101 of a service provider, an electronic device 102 of a service user and a server 103 are shown.

The electronic devices may include, but is not limited to, a POS terminal, a smart phone, a smart pad, a computer and the like that include a GPS sensor, a gyro sensor, an acceleration sensor, a motion recognition sensor for sensing location, acceleration, movement, etc.

The electronic device 102 of the service user may be a wireless communication device such as a smart phone and a smart pad.

Any kind of computer programs may be installed in the electronic device for connecting to the server 103. Applications may be installed if the electronic device is a smart phone or a smart pad.

A service provider's account or a service user's account may be created in the server.

Every service provider's shop or every service provider may have its own account.

The electronic device 101 of the service provider may be located at a predetermined place (e.g., a place where a service is provided). For example, the electronic device 101 of the service provider may be a POS terminal, a computer and the like located in a coffee shop, a hair salon, etc. If the electronic device 101 of the service provider is a wireless communication device such as a smart phone, a smart pad and the like, visit data is transmitted to the electronic device 102 of the service user normally only when a position sensor (e.g., a GPS sensor) included in the electronic device 101 of the service provider validates that the electronic device 101 of the service provider is located at a predetermined place.

If the electronic device 102 of the service user visits the predetermined place where the electronic device 101 of the service provider is located, the electronic device 101 of the service provider may transmit to the server 103 data indicating that the electronic device 102 of the service user has visited the predetermined place (104). The electronic device 102 of the service user may transmit to the server 103 data indicating that it has visited the predetermined place where the electronic device 101 of the service provider is located (105).

If the two data items 104 and 105 match each other, the server 103 may transmit visit data to the electronic device 102 of the service user (106). In addition, the server 103 may store the visit data for the electronic device 102 of the service user.

The visit data transmitted to the electronic device 102 of the service user may be displayed in a predetermined pattern.

Figure 11:
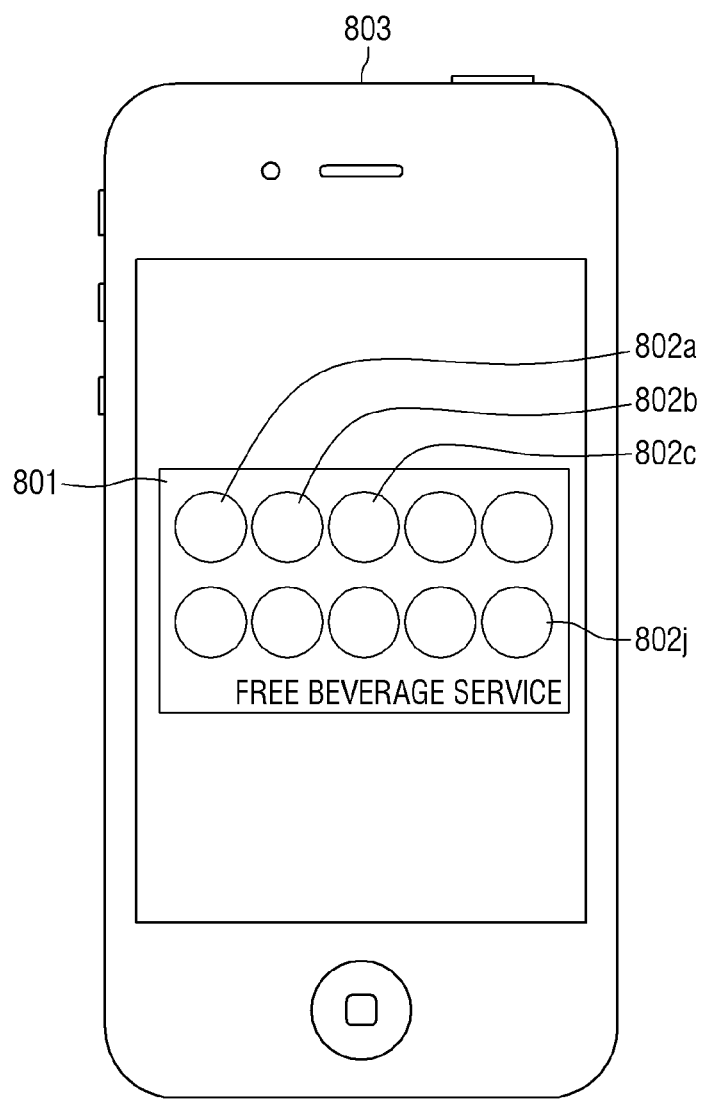
FIG. 11 is a view showing visit data which is transmitted to an electronic device of a service user and displayed in a predetermined pattern.

FIG. 11 shows visit data which is transmitted to the electronic device 803 of the service user and displayed in a predetermined pattern. Referring to FIG. 11, the electronic device 803 of the service user is a smart phone or a smart pad. A mileage coupon similar to a typical paper coupon is displayed on a screen of the electronic device 803. Visit data may be displayed in the circles 802a, 802b, 802c, . . . , 802j depending on the number of visits.

Referring back to FIG. 1, the electronic device 102 of the service user may transmit to the server 103 data regarding the use of a mileage coupon (105). The server 103 may transmit to the electronic device 101 of the service provider data regarding the use of the mileage coupon (107).

Figure 2:
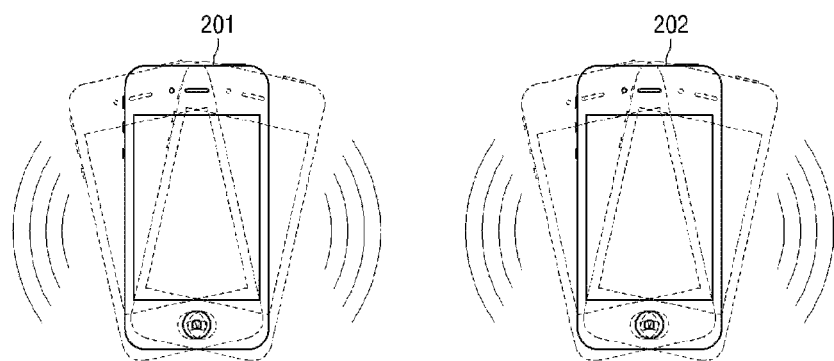
FIG. 2 shows a way of logging visit data according to an exemplary embodiment of the present disclosure.

FIG. 2 shows a way of logging visit data according to an exemplary embodiment of the present disclosure.

Referring to FIG. 2, the electronic device according to the exemplary embodiment of the present disclosure may include a gyro sensor, an acceleration sensor and the like that can sense the movement of the electronic device.

For example, US Patent Application Publication No. 2011-0191823, published on Aug. 4, 2011 and assigned to Bump Technologies, Inc., discloses a process for validating "bump".

According to the reference, if two smart phones indicate their intention to transfer information by taking a particular motion at the same place at the same time using position sensors and motion sensors when transferring data therebetween, a first smartphone transmits data to a server and the server transmits data to a second smart phone.

Referring to the disclosure, the server may transmit to the electronic device 202 of the service user visit data indicating that the electronic device 202 of the service user has been at a place where the electronic device 201 of the service provider is located, if a position sensor senses that the electronic device 202 of the service user is located at a service providing place where the electronic device 201 of the service provider is located (e.g., the distance between the location of the electronic device 201 and the location of the electronic device 202 of the service user sensed by the position sensor is within a predetermined distance), and a predetermined motion condition is met (e.g., the electronic device 201 of the service provider and the electronic device 202 of the service user are shaken to the left and right) while a predetermined time condition is met (e.g., the time difference between when the electronic device 201 of the service provider is shaken and when the electronic device 202 of the service user is shaken is 0.5 second or less).

Although the electronic device 201 of the service provider is a smart phone or a smart pad in FIG. 2, this is merely illustrative but is not limiting. The electronic device 201 may include any electronic device including a position sensor, an acceleration sensor, a gyro sensor, etc.

In addition, the server may transmit visit data to the electronic device 202 of the service user by way of determining that the electronic device 201 of the service provider and the electronic device 202 of the service user are located at the same place using the position sensor, and pressing predetermined keys of the electronic device 201 of the service provider and the electronic device 202 of the service user.

Figure 3:
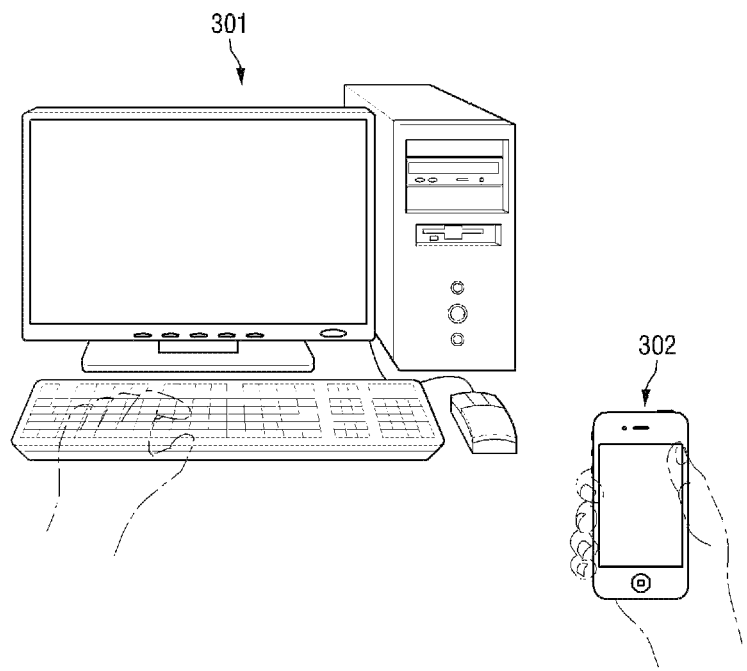
FIG. 3 shows a way of logging visit data according to another exemplary embodiment of the present disclosure.

FIG. 3 shows a way of logging visit data according to another exemplary embodiment of the present disclosure.

Referring to FIG. 3, the electronic device 301 of the service provider may be a POS terminal, a computer, etc.

If a predetermined key (e.g., a space bar) of the electronic device 301 of the service provider is pressed, and if it is sensed by the position sensor and the motion sensor of the electronic device 302 of the service user that the electronic device 302 of the service user visits a predetermined place where the electronic device 301 of the service provider is located and a predetermined motion (e.g., shaking the device to the left and right) is performed within a predetermined time period (e.g., the time difference between when the predetermined key is pressed and when the electronic device 302 of the service user is shaken is 0.5 second or less), the server may receive a signal indicating that the predetermined key is pressed from the electronic device 301 of the service provider and a signal indicating that the predetermined motion is performed at the predetermined place from the electronic device 302 of the service user, may transmit visit data to the electronic device 302, and may store the visit data therein.

The visit data transmitted to the electronic device 302 of the service user may be displayed on a screen of the electronic device 302 of the service user in the form of the mileage coupon shown in FIG. 11.

Figure 4:
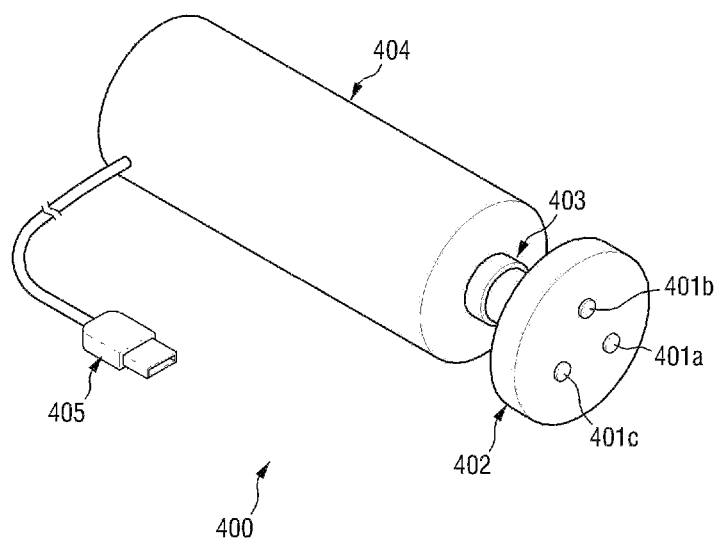
FIG. 4 is a view schematically showing a data transmission device according to an exemplary embodiment of the present disclosure.

FIG. 4 is a view schematically showing a data transmission device according to an exemplary embodiment of the present disclosure.

Referring to FIG. 4, a data transmission device 400 is shown that is connected to the server and transmits visit data to the electronic device of the service user. The data transmission device 400 may include a grip part 404; a button part 403 connected to the grip part 404 and for transmitting to the server data indicating that visit data is to be transmitted to the electronic device of the service user when pressed; and touch screen touching parts 401a, 401b and 401c connected to the button part 403 and for inputting an electrical signal to the touch screen of the electronic device of the service user. The visit data may be transmitted to the electronic device of the service user when the button is pressed and an electrical signal is input to the touch screen. Further, the data transmission device 400 may include a computer connection part 405 for connecting to a variety of computers, in which a computer program required for transmitting the visit data is installed.

The grip part 404 is made of, for example, a conductive material. When the grip part is grasped by a hand, an electrical signal from the hand may be input to the touch screen of the electronic device of the service user along the button part 403 and the touch screen touching parts 401a, 401b and 401c.

Alternatively, the grip part 404 may not be made of a conductive material. Also in this case, an electrical signal can still be input to the touch screen of the electronic device of the service user by way of receiving an electrical signal from a computer connected to the data transmission device 400 or an electrical signal generated in the data transmission device when the touch screen touching parts 401a, 401b and 401c touch the touch screen of the electronic device of the service user.

For example, the touch screen touching parts 401a, 401b and 401c may be a type of buttons, and when the touch screen touching parts 401a, 401b and 401c touch the touch screen of the electronic device of the service user, an electrical signal indicating that the buttons of the touch screen touching parts 401a, 401b and 401c are pressed may be input to the data transmission device 400 or a computer connected to the data transmission device 400. In response to the input, an electrical signal may be input from the computer to the touch screen of the electronic device of the service user, or an electrical signal generated in the data transmission device 400 may be input to the touch screen of the electronic device of the service user. In this configuration, an electrical signal may be transmitted to the touch screen of the electronic device of the service user even if the grip part is not made of a conductive material, by using a current in the data transmission device or a current from a computer connected to the data transmission device in response to the touch by the touch screen touching parts. Thus, this allows a user of the data transmission device to wear gloves.

In the foregoing description, the button may be either a physical button or an electrical button. Accordingly, any type of buttons may be used as long as it can sense either physically or electrically whether the touch screen touching parts 401a, 401b and 401c touch the touch screen of the electronic device of the service user.

The button part 403 is operated in such a manner that the button part 403 is pressed when a user grasps the grip part by a hand and presses the touch screen touching parts 401a, 401b and 401c against the touch screen of the electronic device of the service user. When the button is pressed, the server may recognize that the electronic device of the service user comes in contact with the touch screen touching parts 401a, 401b and 401c. That is, the event that the button is pressed may mean that a service user with an electronic device has entered a place where the data transmission device 400 is installed and had the electronic device being in contact with the data transmission device 400. When the button is pressed, the server may receive data indicating that the electronic device of the service user has visited a place where the data transmission device 400 is installed and thus visit data is transmitted to the electronic device of the service user.

For example, the touch screen touching parts 401*a*, 401*b* and 401*c* may be made of a conductive material. Although the three touch screen touching parts 401*a*, 401*b* and 401*c* are illustrated in this exemplary embodiment of the present disclosure, this is merely illustrative. At least one touch screen touching part may be provided.

The touch screen touching parts 401*a*, 401*b* and 401*c* may be surrounded by a protection part 402 made of a non-conductive material that does not damage the touch screen.

As the touch screen of the electronic device of the service user is touched by the touch screen touching parts 401*a*, 401*b* and 401*c*, the server may be notified that the electronic device of the service user has visited a place where the data transmission device 400 is installed. When the button is pressed and an electrical signal is input to the touch screen, visit data may be transmitted to the electronic device of the service user from the server.

In addition, for example, the visit data may be transmitted to a wireless communication device only if the button is pressed within a time period in which an electrical signal is input to the touch screen of the wireless communication device.

The visit data transmitted to the electronic device of the service user may be displayed on a screen of the electronic device of the service user in the form of the mileage coupon shown in FIG. 11.

Although the visit data is transmitted to the data transmission device 400 on a condition that the button part 403 is pressed in this exemplary embodiment, this is merely illustrative. Alternatively, the data transmission device 400 may include a motion sensor, a gyro sensor, an acceleration sensor, etc., so that the visit data may be transmitted on another condition that the sensors sense the motion of the data transmission device 400.

Further, although the event that the touch screen of the electronic device of the service user is touched by the touch screen touching parts 401*a*, 401*b* and 401*c* has been described as a condition to notify the server that the electronic device of the service user has visited a place where the data transmission device 400 is installed, this is merely illustrative. Instead of inputting an electrical signal from the touch screen touching parts 401*a*, 401*b* and 401*c*, the electronic device of the service user may be moved by physically pressing the touch screen of the electronic device of the service user with the touch screen touching parts 401, 401*b* and 401*c*. Then, the sensors included in the electronic device of the service user may sense the movement, so that the server may be notified that the electronic device of the service user has visited a place where the data transmission device 400 is installed.

In an exemplary embodiment, the electronic device of the service user may be placed on a holder made of an elastic material. When the data transmission device 400 presses the electronic device of the service user placed on the holder with the touch screen touching parts, the movement of the data transmission device 400 and the electronic device of the service user caused by the elasticity of the elastic holder is sensed. By doing so, the server may be notified that the electronic device of the service user has visited a place where the data transmission device 400 is installed.

It may be determined whether the data transmission device 400 and the electronic device of the service user are located at the same place based on the location of a POS terminal, a main computer and the like connected to the data transmission device 400 and the location of a position sensor (e.g., a GPS sensor) of the electronic device of the service user. Alternatively, the data transmission device 400 may include a position sensor therein, so that it may be determined whether the data transmission device 400 and the electronic device of the service user are located at the same place based on the location sensed by the position sensor of the data transmission device 400 and the position sensor of the electronic device of the service user.

According to another exemplary embodiment of the present disclosure, the data transmission device 400 may include a button part, when pressed, for transmitting to the server data indicating that visit data is to be transmitted to a wireless communication device; and touch screen touching parts connected to the button part so as to touch a touch screen of the wireless communication device. The wireless communication device may notify the server that it has been located at a place where the data transmission device 400 is located using the position sensor and the motion sensor. For example, the wireless communication device may be placed on an elastic holder. When the touch screen touching parts of the data transmission device 400 touch the touch screen of the wireless communication device, the button of the data transmission device 400 is pressed, and also the wireless communication device and the holder are pressed, so that the movement of the wireless communication device may be sensed by the motion sensor. When the movement is sensed, the wireless communication device may notify the server that its touch screen has been touched by the touch screen touching parts. Then, the server may transmit visit data to the wireless communication device.

Figure 5:
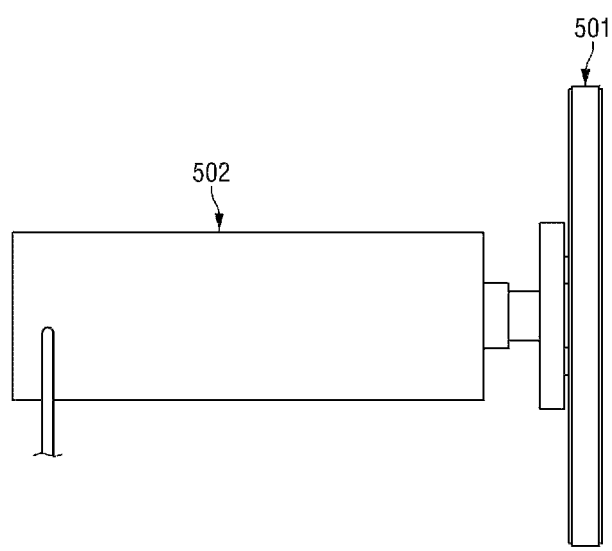
FIG. 5 shows a method of logging visit data using the data transmission device shown in FIG. 3.

FIG. 5 shows a method of logging visit data using the data transmission device shown in FIG. 4.

Referring to FIG. 5, as the touch screen touching parts of the data transmission device 502 touch the electronic device 501 of the service user, the visit data may be input to the electronic device 501 of the service user in the form of the mileage coupon shown in FIG. 11.

For example, with a data transmission device 502 looking like a stamp, a coupon may be stamped using an interface displayed on the touch screen of the electronic device 501 of the service user in a similar manner that a paper coupon is stamped. In this manner, a new user experience can be provided, leading service users and service providers to be interested in collecting coupons.

Figure 6:
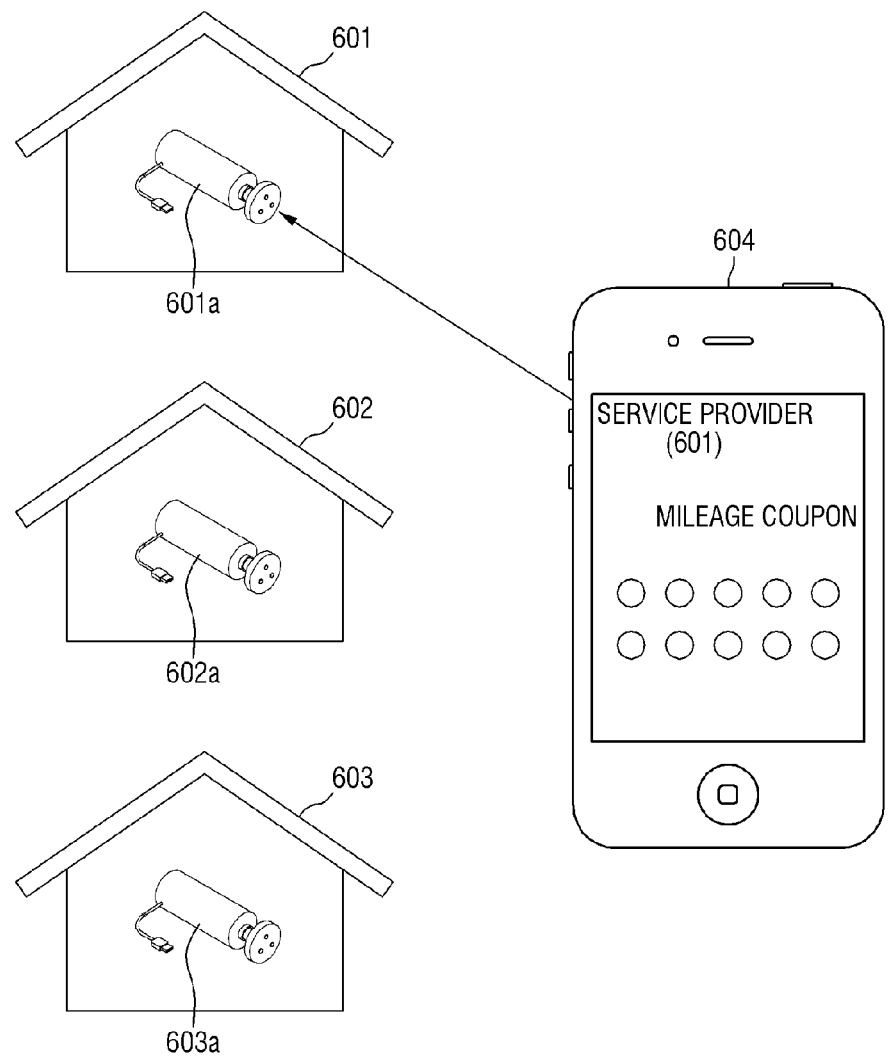
FIG. 6 is a view for conceptually illustrating a way of transmitting visit data to an electronic device of a service user using the data transmission device shown in FIG. 4 according to an exemplary embodiment of the present disclosure.

FIG. 6 is a view for conceptually illustrating a way of transmitting visit data to an electronic device of a service user using the data transmission device shown in FIG. 4 according to an exemplary embodiment of the present disclosure.

Referring to FIG. 6, an electronic device 604 of a service user may visit a service provider 601 among service providers 601, 602 and 603. The touch screen of the electronic device 604 of the service user may be touched by touch screen touching parts of the data transmission device 601*a* installed in the service provider 601*a*.

It may be determined which one of the service providers 601, 602 and 603 the electronic device 604 of the service user has visited by using a position sensor (e.g., a GPS sensor) included in the electronic device 604 of the service user. For example, if it is determined by the position sensor of the electronic device 604 of the service user that the electronic device 604 of the service user and the service provider 601 are located at the same place, a signal is generated indicating that the data transmission device 601*a* touches the touch screen of the electronic device 604 of the service user at the same time, and a signal is generated indicating that the button part of the data transmission device 601*a* is pressed, as described above with respect to FIG. 5. In this manner, visit data may be transmitted to the service user from the service provider either via the server or directly.

Alternatively, instead of determining the location of the electronic device 604 of the service user, it may be determined which one of the data transmission devices 601*a*, 602*a* and 603*a* the electronic device 604 of the service user has visited by determining the button part of which one of the data transmission devices 601*a*, 602*a* and 603*a* is pressed at the same time when the touch screen of the electronic device 604 of the service user is pressed. In this manner, visit data may be transmitted to the service user from the service provider either via the server or directly.

Figure 7A:
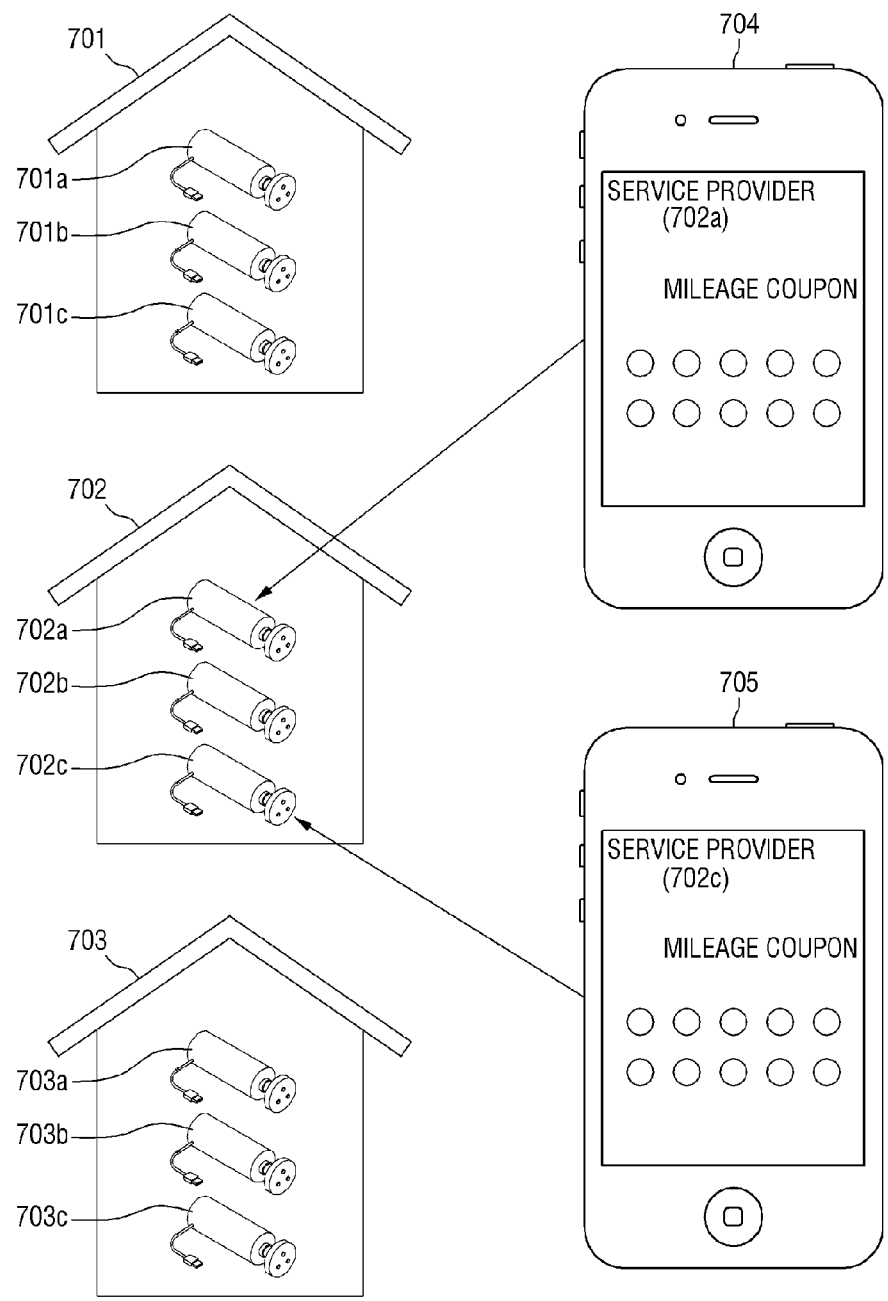
FIG. 7A is a view for conceptually illustrating a way of transmitting visit data to the electronic device of the service user using the data transmission device shown in FIG. 4 according to another exemplary embodiment of the present disclosure.

FIG. 7A is a view for conceptually illustrating a way of transmitting visit data to the electronic device of the service user using the data transmission device shown in FIG. 4 according to another exemplary embodiment of the present disclosure.

Referring to FIG. 7A, there are an electronic device 704 of a first service user, an electronic device 705 of a second service user, and service providers 701, 702 and 703. The service provider 701 includes three data transmission devices 701*a*, 701*b* and 701*c*. The service provider 702 includes three data transmission devices 702*a*, 702*b* and 702*c*. The service provider 703 includes three data transmission devices 703*a*, 703*b* and 703*c*.

For example, if a service provider is a coffee shop, data transmission devices may represent cashiers of the coffee shop, i.e., individual service providers. For example, if a service provider is a hair salon, data transmission devices may represent hair dressers of the hair salon, i.e., individual service providers.

If the electronic device 704 of the first service user and the electronic device 705 of the second service user visit the data transmission device 702*a* and the data transmission device 702*b* of the service provider 702, respectively, their locations may not be accurately determined using a position sensor included in each of the electronic device 704 of the first service user and the electronic device 705 of the second service user. Therefore, it may fail to determine which one of the data transmission devices in the service providers 702 the electronic device 704 of the first service user and the electronic device 705 of the second service user are collocated with, respectively.

If it fails to determine which ones of the data transmission devices the electronic device 704 of the first service user and the electronic device 705 of the second service user are collocated with, respectively, when the touch screen of the electronic device 704 of the first service user and the touch screen of the electronic device 705 of the second service user are touched by the data transmission device 702*a* and the data transmission device 702*c* at the same time, respectively, while the buttons parts of the data transmission device 702*a* and the data transmission device 702*c* are pressed, it may fail to determine which one of the data transmission devices 702*a* and 702*c* the electronic device 704 of the first service user has visited.

To solve this problem, the touch screen touching parts of each of the data transmission devices in a predetermined area may have different layouts.

Figure 8:
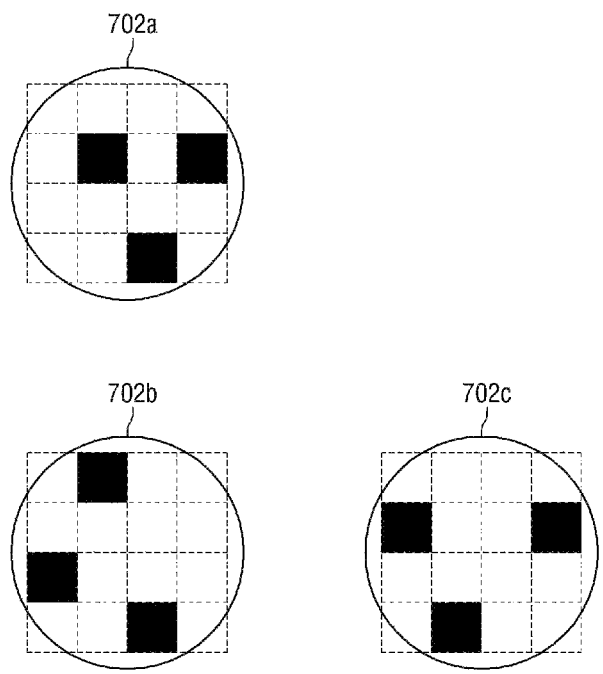
FIG. 8 is a view showing different layouts of the touch screen touching parts of the data transmission device according to an exemplary embodiment of the present disclosure.

For example, as shown in FIG. 8, the touch screen touching parts of each of the three data transmission devices 702*a*, 702*b* and 702*c* installed in the service provider 702 may have different layouts. Referring to FIG. 8, each of data transmission devices 702*a*, 702*b* and 702*c* includes three touch screen touching parts, the layout of one of which is different from the layouts of others.

With different layouts of the touch screen touching parts, it can be determined which one of the data transmission devices the electronic device of the service user has visited by matching the pattern in which the touch screen of the electronic device of the service user is touched to the pattern of the touch screen touching parts of each of the data transmission devices.

The matching may be performed by any algorithm that identifies the relationship between an electrical or physical signal generated when the touch screen of the electronic device of the service user is touched and an identifier associated with an unique layout of the touch screen touching parts of each of the respective data transmission devices or a key value input to a PC connected to the data transmission devices from the layouts.

As a way of the matching, each of the data transmission devices may have an identifier associated with a unique layout of the touch screen touching parts, the electronic device of the service user may check in which pattern the touch screen is touched to determine an associated identifier, and the data transmission device that has touched the electronic device of the service user may be matched based on the determined identifier.

Figure 7B:
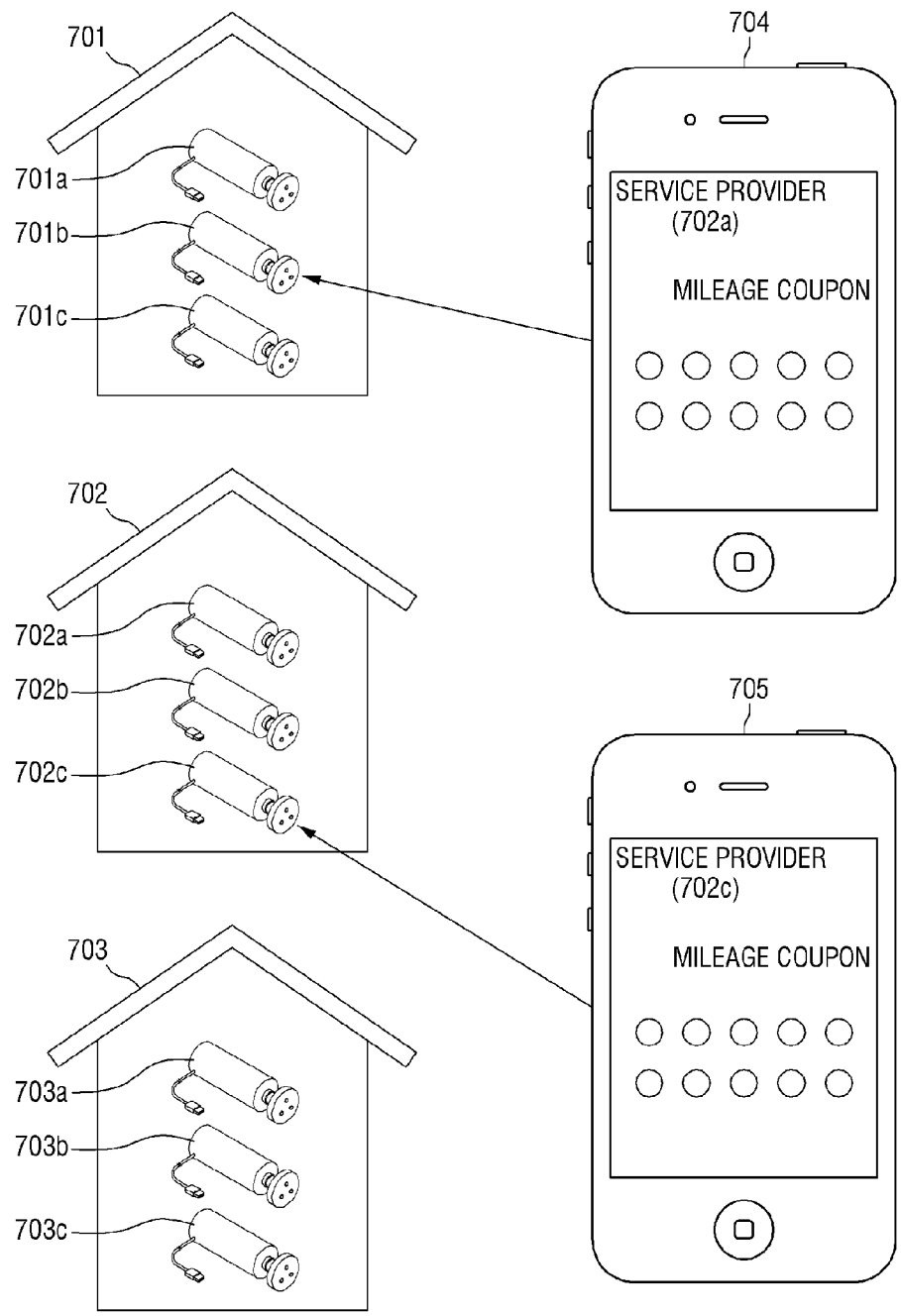
FIG. 7B is a view for conceptually illustrating a way of transmitting visit data to the electronic device of the service user using the data transmission device shown in FIG. 3 according to yet another exemplary embodiment of the present disclosure.

FIG. 7B is a view for conceptually illustrating a way of transmitting visit data to the electronic device of the service user using the data transmission device shown in FIG. 3 according to yet another exemplary embodiment of the present disclosure.

Referring to FIG. 7B, there are an electronic device 704 of a first service user, an electronic device 705 of a second service user, and service providers 701, 702 and 703. The service provider 701 includes three data transmission devices 701*a*, 701*b* and 701*c*. The service provider 702 includes three data transmission devices 702*a*, 702*b* and 702*c*. The service provider 703 includes three data transmission devices 703*a*, 703*b* and 703*c*.

In FIG. 7B, unlike FIG. 7A, the electronic device 704 of the first service user visits the data transmission device 701*b* of the service provider 701, and the electronic device 705 of the second service user visits the data transmission device 702*c* of the service provider 702.

In this example as well, it may fail to determine which the service providers the electronic devices visit, respectively, if the distance between the service provider 701 and the service provider 702 are too close to distinguish by position sensors.

In this case, it is necessary to make different the layouts of the touch screen touching parts 701*a*, 701*b*, 701*c*, 702*a*, 702*b*, 702*c*, 703*a*, 703*b* and 703*c* of the data transmission devices in the respective service providers 701, 702 and 703.

As described above, FIG. 8 shows different layouts of the touch screen touching parts of the data transmission device according to an exemplary embodiment of the present disclosure.

Figure 9:
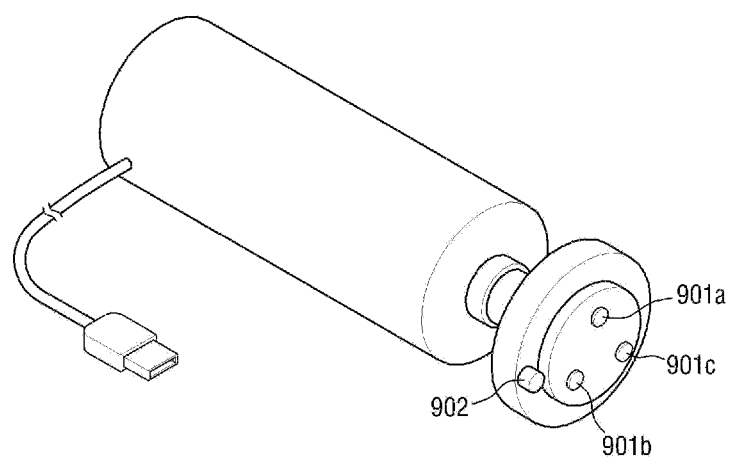
FIG. 9 shows a data transmission device according to an exemplary embodiment of the present disclosure.

FIG. 9 shows a data transmission device according to an exemplary embodiment of the present disclosure.

Referring to FIG. 9, the data transmission device according to the exemplary embodiment of the present disclosure includes touch screen touching parts 901*a*, 901*b* and 901*c*, and a reference magnetic 902.

By disposing the reference magnetic near the touch screen touching parts of the data transmission device, it is possible to distinguish a touch on the touch screen by an object other than the data transmission device (e.g., a hand) from a touch on the touch screen by the touch screen touching parts of the data transmission device according to the exemplary embodiment of the present disclosure based on a change in terrestrial magnetism previously sensed by a terrestrial magnetism sensor included in the electronic device of the service user.

In addition, once the location of the reference magnet is determined by the terrestrial magnetism sensor, it is possible to determine the direction in which the data transmission device touches the touch screen of the electronic device of the service user.

Figure 10:
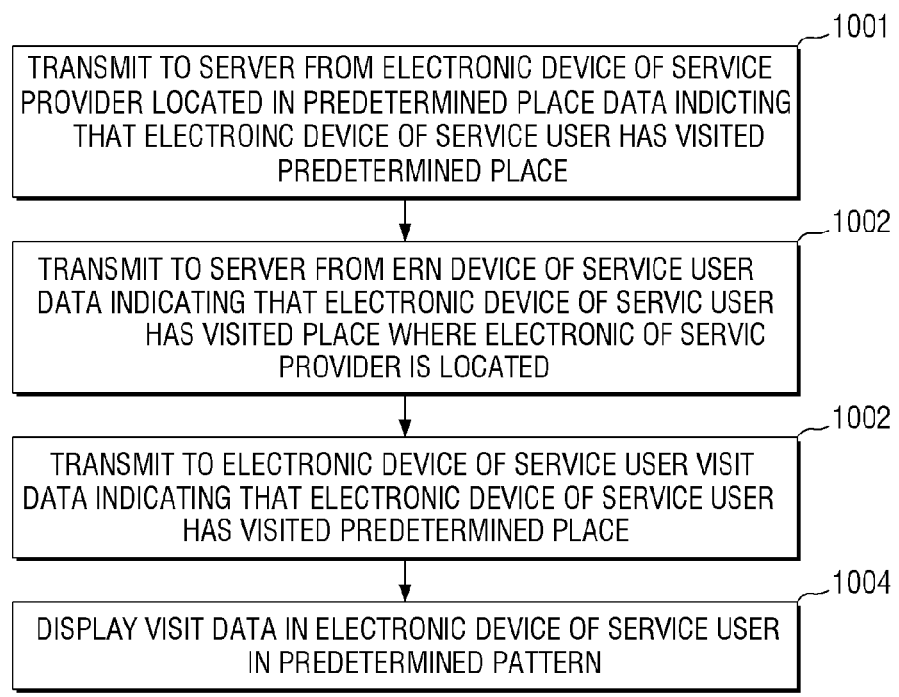
FIG. 10 is flowchart for illustrating a method of logging visit data according to an exemplary embodiment of the present disclosure.

FIG. 10 is flowchart for illustrating a method of logging visit data according to an exemplary embodiment of the present disclosure.

Referring to FIG. 10, in the method of logging visit data, data indicating that an electronic device of a service user has visited a predetermined place may be transmitted to the server from an electronic device of a service provider located at the predetermined place (1001). Subsequently, data indicating that the electronic device of the service user has visited the place where the electronic device of the service provider is located may be transmitted to the server from the electronic device of the service user (1002). Subsequently, visit data indicating that the electronic device of the service user has visited the predetermined location may be transmitted to the electronic device of the service user (1003). Finally, the visit data may be displayed in a predetermined pattern in the electronic device of the service user (1004).

For example, the service provider's account or the service user's account may be created on an application. For example, the term the service provider used herein includes a shop for providing service. Accordingly, when creating the service provider's account, the name of the service providing shop, the type of the service, the category, the location, the representative, the personal information of the service provider, etc., may be input. For example, the service provider's account may be created for each of shops such as a restaurant, a coffee shop, a hair shop, a nail salon or for each of individual service providers such as a waitress/waiter in a restaurant, a barista in a coffee shop, a hair dresser in a hair salon, a manicurist in a nail salon, etc.

The service user's account may be created in a variety of methods. The service user may enter her/his personal information such as the name, the social security number, the e-mail address, etc., in a format in the home page or an application installed in a smart phone (e.g., a tablet PC), to create the service user's account. Alternatively, the service user' account may be created even without the service user's personal information, by installing an application in a smart phone or visiting a shop to use the identification number of the service user' smart phone (e.g., the UDID for a iPhone manufactured by Apple Inc.). For example, the service user's account may be stored in a smart phone and may be validated by the service providing shop.

The visit data indicating that a service user has visited a service provider may be collected from each of service providing shops each of individual service providers. In other words, the visit data may be collected when a service user visits a service providing shop, e.g., a café or a service provider, e.g., a barista. For example, in order to collect visit data when a service user visits a barista, the visit data may be transmitted to an electronic device of the service user from a smart phone logged in the barista's account or may be transmitted to the service user's electronic device by the data transmission device designated by the barista's account.

The visit data may be collected in a server. Such data may be not only displayed on an electronic device of a service user in the form of a mileage coupon but also stored in a server with details including, but is not limiting, the visit number, the location of the visited shop, ordered items, price of the ordered items, etc. In addition, the data may be obtained whenever a service user gets service provided by a service providing shop or provided by an individual service provider. For example, when a service user had her/his hair cut by a service provider A and had her/his hair permed by a service provider B in a hair salon, the provided service may be stored as data indicating haircut and perm for the service providing shop or may be stored as data indicating haircut for the service provider A and data indicating perm for the service provider B. The service providers or service users may check such data by retrieving it from the server whenever necessary.

Then, a reward may be given to a service user based on collected data items.

For example, when the visit data indicates that a service user has visited a shop ten times, a onetime free coupon may be issued to the service user. Such a reward may include, but is not limited to, mileage points, cash back, a gift, etc. The service providers or service users may check such rewards by retrieving it from the server whenever necessary.

For example, a reward may be provided by a service providing shop or an individual service provider. That is, when a service user has visited a hair salon ten times, for example, service for one free haircut may be provided from a service providing shop, e.g., a hair salon. Alternatively, when a service user has visited a hair dresser ten times, for example, a service for one free haircut may be provided from a service provider, e.g., a hair dresser. As such, a reward can be provided from an individual service provider and thus it is possible to collect coupons even if the service provider moves to another shop.

Then, an evaluation on a service providing shop or an individual service provider may be entered in the server by a service user.

Such an evaluation may be shared by other service users via a social network service (SNS), such as Facebook or a dedicated application. Alternatively, an evaluation on an individual service provider may be set to be open only to a representative of a service providing shop. A representative of a service providing shop may give a reward or penalty to an individual service provider depending on the evaluation on the service provider.

In addition, if a survey is carried out among participants in an off-line meeting, only service users carrying electronic devices to which such visit data is transmitted may be authorized to take the survey or to vote.

According to an exemplary embodiment of the present disclosure, a system for logging visit data of a wireless communication device may be disclosed. The system includes a wireless communication device including at least one sensor capable of sensing a location and a motion; an electronic device including at least one key for transmitting data to a server; and the server for transmitting to the wireless communication device visit data indicating that the wireless communication device has visited a place where the electronic device is installed. The server may transmit the visit data to the wireless communication device indicating that the wireless communication device has visited a place where the electronic device is installed, if the at least one sensor included in the wireless communication device senses that the wireless communication device exists in a place where the electronic device is installed and a predetermined key among one or more keys of the electronic device is pressed while the at least one sensor included in the wireless communication device senses that a predetermined motion of the wireless communication device has been performed.

For example, the predetermined key among one or more keys of the electronic device may be a space bar. The predetermined motion of the wireless communication device may be shaking the wireless communication device to the left and right.

Further, the visit data may be set to be transmitted only if the time difference between when the predetermined key among the one or more keys of the electronic device is pressed and when the predetermined motion of the wire communication device is sensed is within a predetermined time period.

Further, the visit data may be set to be transmitted only if the time difference between when the predetermined key among the one or more keys of the electronic device is pressed and when the predetermined motion of the wire communication device is sensed is within five seconds, for example.

For example, it is determined that the wireless communication device exists in a place where the electronic device is installed if the place where the electronic device is installed and the location sensed by a position sensor of the wireless communication device is within a predetermined distance. Accordingly, the visit data may be set to be transmitted only if the condition is met.

For example, visit data may be set to be transmitted only if the place where the electronic device is installed and the location sensed by a position sensor of the wireless communication device is within five meters.

The place where the electronic device is installed may be sensed from a position sensor included in the electronic device or may be determined based on the location of a franchise reported as having the electronic device installed therein or the location of a service provider.

According to yet another exemplary embodiment of the present disclosure, a system for logging visit data of a wireless communication device may be disclosed. The system includes a wireless communication device including at least key for transmitting data to a server; an electronic device including at least one key for transmitting data to the server; and the server for transmitting to the wireless communication device visit data indicating that the wireless communication device has visited a place where the electronic device is installed. The server may transmit to the wireless communication device the visit data indicating that the wireless communication device has visited a place where the electronic device is installed, if the at least one sensor included in the wireless communication device senses that the wireless communication device exists in a place where the electronic device is installed and a predetermined key among one or more keys of the electronic device is pressed while a predetermined key among one or more keys of the wireless communication device senses is pressed.

For example, the predetermined key among the one or more keys of the wireless communication device may be a button displayed on a display, e.g., a touch screen when an application installed in the wireless communication device is running. The predetermined key among the one or more keys may be a space bar.

Further, the visit data may be set to be transmitted only if the time difference between when the predetermined key among the one or more keys of the electronic device is pressed and when the predetermined key of the wire communication device is pressed within a predetermined time period.

Further, the visit data may be set to be transmitted only if the time difference between when the predetermined key among the one or more keys of the electronic device is pressed and when the predetermined key of the wire communication device is pressed is within five seconds.

For example, it is determined that the wireless communication device exists in a place where the electronic device is installed if the place where the electronic device is installed and the location sensed by a position substantially of the wireless communication device is within a predetermined distance. Accordingly, the visit data may be set to be transmitted only if the condition is met.

For example, visit data may be set to be transmitted only if the place where the electronic device is installed and the location sensed by a position sensor of the wireless communication device is within five meters.

The place where the electronic device is installed may be sensed from a position sensor included in the electronic device or may be determined based on the location of a franchise reported as having the electronic device installed therein or the location of a service provider.

In one or more implementations, the above-described functionality may be achieved by hardware, software, firmware or a combination thereof. For a software implementation, the functionality may be stored in a computer-readable storage medium as one or more instructions or codes or may be transmitted therethrough. The computer-readable storage medium includes a communication medium including a computer storage medium and any medium that facilitates transfer of a computer program from one place to another. The storage medium may be any available medium that can be accessed by a general-purpose computer or a special-purpose computer. For example, such a computer-readable storage medium may be a RAM, a ROM, an EEPROM, a CD-ROM or other optical disc storage medium, a magnetic disc storage medium or other magnetic storage devices, and may be used for storing program code means required in the form of instructions or data structure. The computer-readable storage medium may include, but is not limited to, any other mediums that can be accessed by a general-purpose computer, a special-purpose computer or a special-purpose processor. In addition, the computer-readable storage medium may include any connection means. For example, if software is transmitted using a coaxial cable, an optical fiber cable, a stranded cable, a digital subscriber line (DSL) or a wireless technique such as infrared radio and microwave from a website, a server, etc., such a coaxial cable, an optical fiber cable, a stranded cable, a digital subscriber line (DSL) or a wireless technique such as infrared radio and microwave may fall within the definition of the computer-readable storage medium. As used herein, a disk or disc includes a compact disc (CD), a laser disc, an optical disc, a DVD, a floppy disk, and a blu-ray disc. In this connection, it is to be noted that a disk reproduces data magnetically and a disc by contrast reproduces data optical using laser. A combination thereof may also be included in the definition of the computer-readable storage medium.

The data communication between a server and a terminal, etc., may be carried out any communication means for short-range and long range.

The descriptions have been given to enable those skilled in the art to practice the exemplary embodiments of the present disclosure. Various modifications to the exemplary embodiments will be obvious to those skilled in the art and the general principles defined herein may be applied to other embodiments without departing from the scope of the present disclosure. The scope of the present disclosure is not limited to the exemplary embodiment disclosed herein but is to be construed as the broadest scope equivalent to the principles and novel features disclosed herein.

According to embodiments of the present disclosure, it is possible to ensure that a service user has actually visited a service providing shop and accordingly a variety of benefits can be provided to the service user.

In addition, it is possible to prevent false validation and evaluation made by a service user who has actually not visited a service providing shop.

Further, a reward for visiting a predetermined number can be given not only from a service providing shop but also from an individual service provider, as well as an evaluation on the individual service provider.

Moreover, a service user and a service provider can be subject to a new experience of collecting coupons via a novel interface.

In addition, it is possible to precisely distinguish which one of service providers a service user visits despite the technical limitation of a position sensor.

In order to accomplish the above and other objects, one or more embodiments will be described below, which include features defined by the appended claims. The following descriptions and the accompanying drawings specifically illustrate aspects of the exemplary embodiment of the present disclosure. Those skilled in the art will understand that such aspects are merely illustrative and a variety of modification are possible to the embodiments. The disclosed embodiments are intended to cover all the embodiments and equivalents thereof falling within the spirit and scope of the present disclosure.

What is claimed is:

1. A data transmission device located at a location of a shop of a service provider comprising:
    a button part configured to, when pressed, cause the data transmission device to transmit, to a server, first data indicating that visit data is to be transmitted to a wireless communication device, wherein the visit data provides validation that the wireless communication device was present at the location of the shop; and
    touch-screen contacting parts, configured in a first layout and connected to the button part, wherein the contacting parts are configured to be sensed by a touch screen of the wireless communication device to generate a sensed layout of the contacting parts,
    wherein the first layout differs from a second layout of contacting parts of a second data transmission device, wherein the data transmission device and the second data transmission device are located within a predetermined area, and
    wherein the visit data is transmitted to the wireless communication device from the server after the button part is pressed and the contacting parts in the first layout are sensed by the touch screen, and wherein the validation that the wireless communication device was present at the location of the shop is based on the sensed layout of the contacting parts.

2. The data transmission device of claim 1, wherein the first layout of touch-screen contacting parts comprises three, four, or five touch-screen contacting parts.

3. The data transmission device of claim 1,
    wherein the validation is based on a determination of which data transmission device in the predetermined area has contacted the wireless communication device based on a match of the sensed layout with the first layout, and
    wherein the server transmits the visit data to the wireless communication device that corresponds to the determined data transmission device.

4. The data transmission device of claim 1, further comprising:
    a reference magnet, that affects a terrestrial magnetism sensor of the wireless communication device when the touch-screen contacting parts contact the touch screen of the wireless communication device, to indicate a direction in which the touch-screen contacting parts contact the touch screen.

5. A data transmission system comprising:
    a wireless communication device comprising a touch screen and a location sensor;
    a data transmission device, located at a location of a shop of a service provider, comprising:
        a button part configured to, when pressed, cause the data transmission device to transmit to a server, first data indicating that visit data is to be transmitted to the wireless communication device, wherein the visit data provides validation that the wireless communication device was present at the location of the shop, and
        touch-screen contacting parts, configured in a first layout and connected to the button part, wherein the contacting parts are configured to be sensed by a touch screen of the wireless communication device to generate a sensed layout of the contacting parts; and
    the server, configured to transmit the visit data to the wireless communication device when the location sensor included in the wireless communication device senses that the wireless communication device is located a the location of the shop of the service provider, when the button part has been pressed, and when the touch screen has sensed the first layout of the contacting parts, and
    wherein the first layout of touch-screen contacting parts differs from a second layout of touch-screen contacting parts of a second data transmission device in a predetermined area.

6. The data transmission system of claim 5, wherein the first layout of touch-screen contacting parts comprises three, four, or five screen touching touch-screen contacting parts.

7. The data transmission system of claim 5,
    wherein the validation is based on a determination of which data transmission device in the predetermined area has contacted the wireless communication device based on a match of the sensed layout with the first layout shape of the plurality of touch screen touching parts recognized by the touch screen of the wireless communication device, and
    wherein the server transmits the visit data to the wireless communication device that corresponds to the determined data transmission device.

8. The data transmission system of claim 5, wherein the data transmission device further comprises:
    a reference magnet, that affects a terrestrial magnetism sensor of the wireless communication device when the touch-screen contacting parts contact the touch screen of the wireless communication device, to sense indicate a direction in which the touch-screen contacting parts contact the touch screen.

* * * * *

UNITED STATES PATENT AND TRADEMARK OFFICE
CERTIFICATE OF CORRECTION

PATENT NO. : 9,716,981 B2
APPLICATION NO. : 14/772771
DATED : July 25, 2017
INVENTOR(S) : Sang Jun Park et al.

It is certified that error appears in the above-identified patent and that said Letters Patent is hereby corrected as shown below:

In the Claims

Claim 5, Column 18, Line 36, replace the word "a" with "at"

Claim 8, Column 18, Line 63, delete the word "sense"

Signed and Sealed this
Thirty-first Day of October, 2017

Joseph Matal
*Performing the Functions and Duties of the
Under Secretary of Commerce for Intellectual Property and
Director of the United States Patent and Trademark Office*